United States Patent
Jurkovic et al.

(10) Patent No.: US 10,524,544 B2
(45) Date of Patent: Jan. 7, 2020

(54) DIVERGENCE DETECTION OF A SHOE BITE LINE

(71) Applicant: NIKE, INC., Beaverton, OR (US)

(72) Inventors: Dragan Jurkovic, Taichung (TW); Ming-Feng Jean, Douliu (TW); Chih-Chi Chang, Douliu (TW); Chin-Yi Lin, Douliu (TW)

(73) Assignee: Nike, Inc., Beaverton, OR (US)

(\*) Notice: Subject to any disclaimer, the term of this patent is extended or adjusted under 35 U.S.C. 154(b) by 817 days.

(21) Appl. No.: 14/161,283

(22) Filed: Jan. 22, 2014

(65) Prior Publication Data
US 2015/0201709 A1    Jul. 23, 2015

(51) Int. Cl.
| | | |
|---|---|---|
| *A43D 1/08* | (2006.01) |
| *A43B 23/02* | (2006.01) |
| *G01B 21/00* | (2006.01) |
| *A43D 119/00* | (2006.01) |
| *A43D 25/06* | (2006.01) |

(52) U.S. Cl.
CPC ............ *A43D 1/08* (2013.01); *A43B 23/0255* (2013.01); *A43D 25/06* (2013.01); *A43D 119/00* (2013.01); *G01B 21/00* (2013.01); *A43D 2200/10* (2013.01); *A43D 2200/60* (2013.01)

(58) Field of Classification Search
CPC ....... G06F 17/5086; G06F 2203/04103; A43D 1/04; A43D 1/08; A43D 2200/60; A43D 21/006; A43D 11/006; A43D 23/02
USPC .......................................................... 703/1
See application file for complete search history.

(56) References Cited

U.S. PATENT DOCUMENTS

| | | | |
|---|---|---|---|
| 4,304,020 A | 12/1981 | Bonnet et al. | |
| 4,996,012 A | 2/1991 | Gierschewski et al. | |
| 2001/0020222 A1* | 9/2001 | Lee | A43D 1/025 |
| | | | 702/155 |
| 2013/0132038 A1* | 5/2013 | Regan | G06F 17/50 |
| | | | 703/1 |
| 2014/0081441 A1 | 3/2014 | Regan et al. | |

FOREIGN PATENT DOCUMENTS

| | | |
|---|---|---|
| CN | 101061897 A | 10/2007 |
| CN | 102742977 A | 10/2012 |
| CN | 202907979 U | 5/2013 |

(Continued)

OTHER PUBLICATIONS

Hu et al. "Computer vision for shoe upper profile measurement via upper and sole conformal matching", Opticas and Lasers in Engineering 45 (2007) 183-190,Elsevier Ltd).*

(Continued)

*Primary Examiner* — Omar F Fernandez Rivas
*Assistant Examiner* — Bernard E Cothran
(74) *Attorney, Agent, or Firm* — Shook, Hardy & Bacon LLP

(57) ABSTRACT

Systems and methods are provided for collecting three-dimensional surface data of a lasted shoe upper that is mated with a sole that is configured for the lasted upper. The mated three-dimensional data is used with three-dimensional data of the lasted shoe upper in an unmated configuration with the sole to determine a location of an edge defined by the intersection of the lasted upper and the sole when mated. The bite line identifies an edge where the upper and a sole assembly will intersect on a finished shoe, which may represent a bounding line for application of adhesive to the lasted upper for boding the sole thereto.

20 Claims, 8 Drawing Sheets

(56) References Cited

FOREIGN PATENT DOCUMENTS

| | | |
|---|---|---|
| CN | 103284407 A | 9/2013 |
| DE | 3341118 C1 | 8/1984 |
| DE | 19721543 A1 | 11/1998 |
| DE | 10343620 * | 4/2005 |
| DE | 10343620 A1 | 4/2005 |
| WO | 2015076947 A1 | 5/2015 |

OTHER PUBLICATIONS

Winter "Method and Device for Detecting Side Regions of Shoe Uppers Mounted on Lasts, Which Regions Are Intended for Roughening" DE10343620, English Translation by Human, Apr. 28, 2005, Germany, pp. 1-42.*
The Free Dictionary, Definition of unmated, 2018, The Free Dictionary, pp. 1-3 (Year: 2018).*
Shi et al., A CAD System for Shoe Last Customization, 2009, IEEE, pp. 957-960 (Year: 2009).*
International Search Report with Written Opinion dated May 11, 2015 in Application No. PCT/US2015/012483, 13 pages.
International Preliminary Report on Patentability dated Aug. 4, 2016 for International Patent Application No. PCT/US2015/012483, 9 pages.
Communication pursuant to Article 94(3) EPC dated Jul. 23, 2018 in European Application No. 15704141.9, 8 pages.
Communication under Rule 71(3) dated Jan. 25, 2019 in European Patent Application No. 15704141.9, 7 pages.

* cited by examiner

DIVERGENCE DETECTION OF A SHOE BITE LINE

CROSS-REFERENCE TO RELATED APPLICATIONS

Not applicable.

TECHNICAL FIELD

Multiple sets of three-dimensional surface data are used for the determination of a bite line on a shoe for automated manufacturing processes.

BACKGROUND

An article of footwear, such as a shoe, may be manufactured by bonding a sole assembly to a shoe upper. The process of applying the bonding agent, such as an adhesive, to the shoe upper is a manual process that may include temporarily combining the sole and the upper so that a laborer can visually identify the portions of the upper that will be covered by the sole when permanently bonded. The laborer may then remove the sole and carefully apply the bonding agent to the upper while ensuring to not extend the application of the bonding agent into the portions of the upper that will be visible following the application of the sole. The bonding agent may stain or otherwise aesthetically interfere with the finished shoe if the bonding agent is exposed after assembly. However, the laborer must also ensure the bonding agent is applied to a sufficient portion of the upper to ensure effective bonding to the edge of the sole. Therefore, the bonding of a sole with an upper is a manual process that requires care during execution.

BRIEF SUMMARY

Aspects hereof provide systems and methods for collecting three-dimensional surface data of a lasted upper mated with a sole that is configured for the lasted upper. The mated three-dimensional data is used in combination with three-dimensional data of the lasted upper in an unmated configuration with the sole to determine a location of an edge defined by the intersection of the lasted upper and the sole when mated. The determination may be made by determining when points of the mated three-dimensional data diverge from points of the unmated lasted upper data, in an exemplary aspect.

Additional aspects provide a bite line determination system. The system includes a rotation mechanism, such as a drive motor, configured to rotate a lasted upper or a sensing assembly. The system also includes a mating mechanism configured to mate and un-mate a sole from the lasted upper. For example, the mating mechanism may be configured to move linearly in a direction parallel with an axis about which the rotation mechanism rotates. The system also may include a sensing assembly comprising a structured light source (e.g., a laser) and a sensing device (e.g., an imaging device). The sensing assembly may be configured, in an exemplary aspect, to move linearly in a direction perpendicular with the axis about which the rotation mechanism rotates in an exemplary aspect. Alternatively, it is contemplated that the sensing mechanism may move, such as in a circular or elliptical fashion, about the lasted upper. Additionally, the system is comprised of a computing device having a processor and memory adapted to determine a bite line of the lasted upper based on three-dimensional data collected by the sensing assembly and processed by the computing device for the lasted upper and the sole in a mated relationship and in an un-mated relationship.

BRIEF DESCRIPTION OF THE DRAWINGS

The present invention is described in detail herein with reference to the attached drawing figures, wherein.

DETAILED DESCRIPTION

Figure 1:
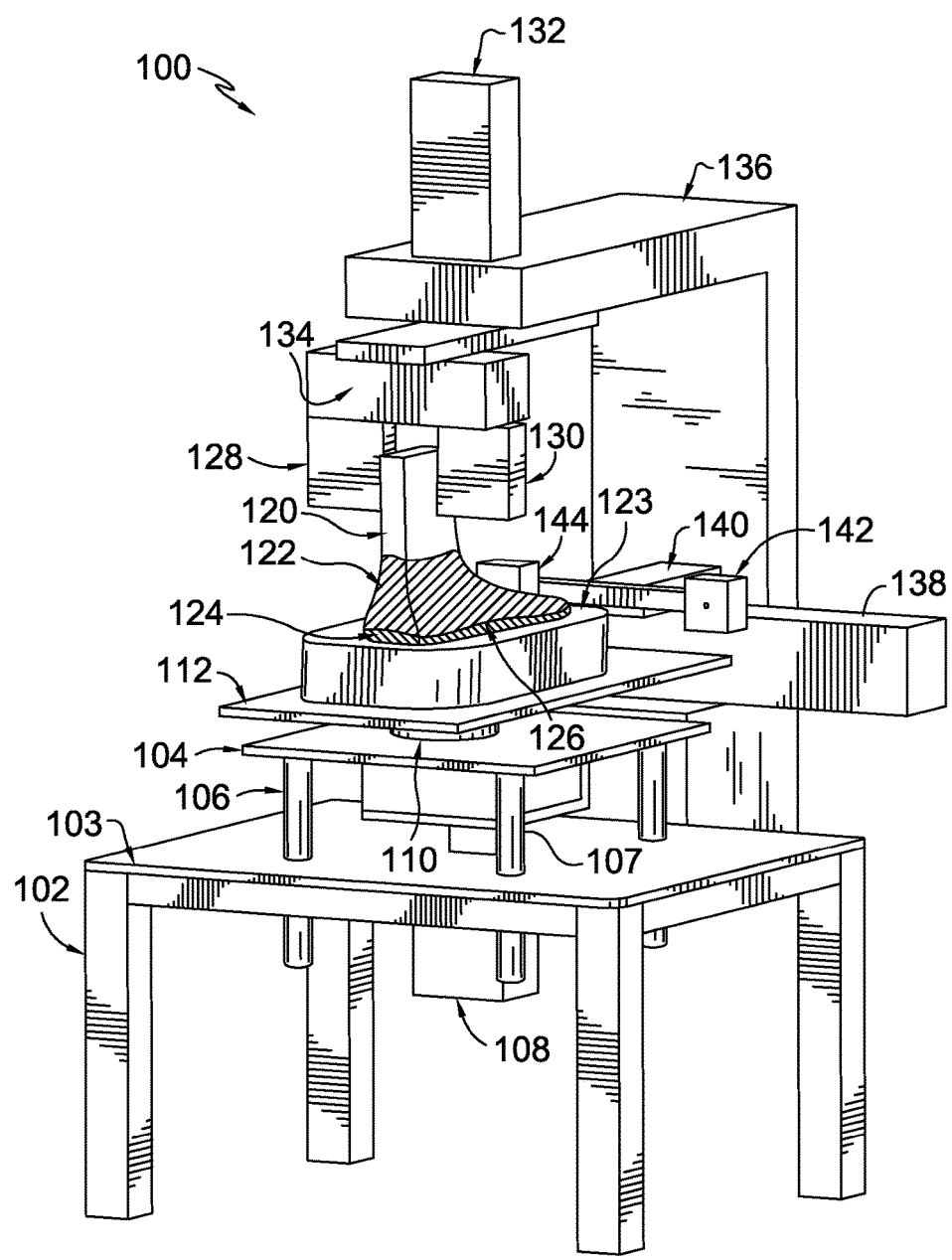
FIG. 1 depicts an exemplary system that is effective for capturing three-dimensional surface information of a lasted upper and a sole in accordance with aspects hereof.

Aspects hereof provide systems and methods for collecting three-dimensional surface data of a lasted shoe upper mated with a sole that is configured for the lasted upper. The mated three-dimensional data is used in combination with three-dimensional data of the lasted upper in an unmated configuration with the sole to determine a location of an edge defined by the intersection of the lasted upper and the sole when mated. As the sole is configured for and may ultimately serve as the coupled sole to the lasted upper, the lasted upper and the sole, when mated, identify the location of a desired bite line at the surface intersection formed between the lasted upper and the sole.

Aspects further include a method for determining a bite line on a lasted shoe upper. The method includes mating a lasted upper with a sole that is configured for the lasted upper. After mating the lasted upper and the sole, collecting three-dimensional data representing the mated lasted upper and the sole. The mated three-dimensional data includes at least an edge defined by a transition from the lasted upper to the sole, the edge identifying the bite line on the lasted upper. The method also includes repositioning the sole relative to the lasted upper into an un-mated configuration. The repositioning may include moving either the lasted upper and/or the sole, in various aspects. The method continues with collecting three-dimensional data representing the un-mated lasted upper and the sole. Further, the method includes determining the bite line for the lasted upper based on the mated three-dimensional data and the un-mated three-dimensional data, such as through a detection of divergence of points between the three-dimensional data representing the un-mated and the mated configurations.

Additional aspects provide a bite line determination system. The system includes a rotation mechanism, such as a drive motor, configured to rotate a lasted upper and/or a sensing assembly. The system also includes a mating mechanism configured to mate and un-mate a sole from the lasted upper. The mating mechanism is configured, in an exemplary aspect, to move linearly in a direction parallel with an axis about which the rotation mechanism rotates. For example, a vertical system provided herein that is effective to raise and lower the sole relative to the lasted upper is contemplated as an exemplary mating mechanism.

The system also includes a sensing assembly comprising a structured light source (e.g., a laser) and a sensing device (e.g., an imaging device). The sensing assembly (also referred to as a sensing system) is configured to move in a manner that allows an effective capture of three-dimensional data. For example, the sensing assembly may move linearly in a direction perpendicular with the axis about which the rotation mechanism rotates in an exemplary aspect. Further, it is contemplated that the sensing assembly may also or alternatively move in a rotational (e.g., circular, elliptical) manner to capture three-dimensional data. It is also contemplated that a combination of movement mechanisms may be implemented in combination to achieve a desired capture of three-dimensional data, such as a rotational movement of the lasted upper and a linear movement of the sensing assembly to achieve a relatively consistent depth of field from the sensing assembly and the lasted upper, in an exemplary aspect. Further, it is contemplated that one or more portions of the sensing assembly may move in a vertical direction (e.g., Z-axial direction). For example, it is contemplated that the sensing device may move up and down to achieve a better perspective of the intersection between the lasted upper and the sole at different location along the perimeter of the lasted upper. In this example, logic may be programmed that controls the vertical movement of the one or more portions of the sensing assembly based on the particular lasted upper/sole being sensed. Stated differently, one or more portions of a sensing assembly may move together or independently in all directions of space at any given time and location. Therefore, one or more portions of the sensing assembly may move in an X, Y, and/or Z space of a three-dimensional volume.

Additionally, the system is comprised of a computing device having a processor and memory adapted to determine a bite line of the lasted upper based on three-dimensional data collected by the sensing assembly and processed by the computing device for the lasted upper and the sole in a mated relationship and in an un-mated relationship. The computing device may be any computing device as will be discussed hereinafter at FIG. 8. For example, it is contemplated that the computing device may be a personal computer-styled computing device in an exemplary aspect.

While the examples of shoe uppers and shoe soles are presented in a simplified fashion for exemplary purposes herein, in practice a shoe upper may comprise a large number of individual parts, often formed from different types of materials. The components of a shoe upper may be joined together using a variety of adhesives, stitches, and other types of joining components. A shoe sole may be comprised of multiple components. For example, a shoe sole may comprise an outsole made of a relatively hard and durable material, such as rubber, that contacts the floor, ground, or other surface. A shoe sole may further comprise a midsole formed from a material that provides cushioning and absorbs force during normal wear and/or athletic training or performance. Examples of materials often used in midsoles are, for example, ethylene vinyl acetate foams, polyurethane foams, and the like. Shoe soles may further have additional components, such as additional cushioning components (such as springs, airbags, and the like), functional components (such as motional control elements to address pronation or supination), protective elements (such as resilient plates to prevent damage to the foot from hazards on the ground or floor), and the like. As can be appreciated, it is contemplated that when a sole is mated with a lasted upper for bite line detection, the sole may comprise the outsole, the midsole, and/or any additional components forming a shoe sole. While these and other components that may be present in a shoe upper and/or a shoe sole are not specifically described in examples set forth herein, such components may be present in articles of footwear manufactured using systems and methods in accordance with aspects hereof.

Methods and systems provided herein allow for an identification of a bite line on a shoe upper. A bite line is a location along the intersection of a shoe sole assembly and a shoe upper portion. Traditionally, in the manufacturing of footwear, a bite line is identified by placing the shoe sole assembly that will be coupled with the shoe upper along the bottom of the lasted shoe upper to identify the bite line. The bite line determination is desired in order to determine a location up to which one or more bonding agents may be applied to the lasted upper without exposing the bonding agent after the assembly of the upper and shoe sole assembly. However, in manufacturing of a shoe, automation of the process may benefit from providing a digital representation of a digital bite line for a particular shoe upper. Therefore, aspects provided herein provide means for identifying a bite line digitally for a particular shoe upper through a divergence detection process involving a first set of three-dimensional surface information of a lasted upper and a sole in a mated configuration and also a second set of three-dimensional surface information of the lasted upper unmated with the sole. The first set and the second set of three-dimensional surface information, when compared to one another, identify an intersection of the sole on the lasted upper when mated, which represents, at least in part, the bite line for the lasted upper, in an exemplary aspect. This identification may be accomplished by overlaying the data points representing the three-dimensional surfaces of the mated configuration and the unmated configuration to locate a divergence of data points beyond a predefined threshold. At this divergence of overlaid data points, a change in the surface geometry from the mated configuration to the unmated configuration may be determined, which may occur at the bite line, in an exemplary aspect. Once a bite line is determined for a lasted shoe upper, the data defining the bite line may be used by a machine, such as a multi-axial robot, to apply an agent, such as an adhesive, to the lasted upper as bounded by the determined bite line, in an exemplary aspect. In addition to the application of an agent, it is contemplated that other uses of the provided techniques and articles may be implemented in the manufacturing of an article.

Referring now to FIG. 1, an exemplary system that is effective for capturing three-dimensional surface information of a lasted upper 122 and a sole 124 in accordance with aspects hereof is illustrated and designated generally as reference numeral 100. As will be discussed in more detail herein, a maintainer 123, such as a silicone pad having a cavity formed therein for receiving the sole 124, may be used to maintain and secure the sole 124 for the mated and un-mated data capture. The system 100 is comprised of a base support 102 having a top surface 103. The base support 102 may be a configuration effective for supporting one or more of the components discussed hereinafter for use in a system, such as the system 100.

The system 100 is further comprised of a vertical assembly that is effective to raise and lower the sole 124 from a mated to an unmated configuration. The vertical assembly is comprised of a support plate 104 that is slidably coupled with the top surface 103 of the base support 102 by way of guide members 106, 107. The guide members slidably interact with the top surface 103 to provide stability to the support plate 104 and components coupled thereto while still facilitating a vertical motion of the support plate 104. The vertical motion is actuated by a vertical actuator 108. The vertical actuator 108 is configured to raise and lower at least the support plate 104 to consequently allow for the mating and unmating of the base unit 124 and the lasted upper 122. The vertical actuator 108 may cause vertical movement using a number of mechanisms, such as pneumatic, hydraulic, linear motors, and the like. As depicted, a portion of the vertical actuator 108 extends through the top surface 103 to interact with the support plate 104. In alternative aspects, it is contemplated that the vertical actuator 108 may be configured in alternative manners to achieve a movement of the sole 124 from a mated to an unmated configuration.

As depicted, the maintainer 123 may be configured such that at least a portion of the sole 124 is positioned within a cavity of the maintainer 123. However, it is contemplated that at least a portion of the sole 124 proximate a superior edge of the sole 124 extends above the maintainer 123 to allow for three-dimensional data capture of the lasted upper 122 and the sole 124 at the bite line. The maintainer 123 may be formed from any suitable material, such as silicone. The maintainer 123 may be configured of any size and shape such that the intersection between the sole 124 and the lasted upper 122 is able to be captured effectively by a sensing assembly. Further, it is contemplated that the maintainer 123 may be omitted entirely in exemplary aspects hereof.

The vertical assembly is further comprised of a swivel 110 rotationally coupling the support plate 104 with a rotational plate 112. The swivel 110 allows the rotational plate 112 to rotate independently of the support plate 104. As will be discussed hereinafter, the sole 124 may be engaged with the lasted upper 122 as the lasted upper 122 rotates. As the sole 124 is in contact with and supported by the rotational plate 112 via the maintainer 123 in an exemplary aspect, the swivel 110 allows for the rotational plate 112 and the sole 124 to rotate freely of the support plate 104. As the vertical assembly is positioned at different vertical positions, components of the vertical assembly move in unison to achieve a mating an unmating configuration of the sole 124 and the lasted upper 122.

In the illustrated system 100, the shoe upper 122 has been placed on a last 120, which historically provides a volumetric approximation of an intended shaping of the shoe upper. The sole 124, by way of the vertical assembly, may apply a predetermined amount of force to retain the lasted upper 122 against the corresponding sole 124. Upon applying the pressure, the sole 124 is mated with the lasted upper 122. Once mated with the desired pressure, an intersection between the lasted upper 122 surface and the sole surface 124 forms an intersection 126. The intersection 126 represents a location of a bite line for the lasted upper 122.

It should be noted that, in processing, the sole 124 may emulate, if not the actual sole to be mated with the shoe upper 122, the actual materials, size, shape, contours, etc. of a shoe sole assembly that will be applied to the shoe upper 122 upon assembly of the shoe. Further, it is contemplated that the sole 124 may be formed from a material different from that which is typically used for the sole assembly when the sole 124 is not the intended ultimate sole. For example, a more durable and rigid material may form at least a portion of the sole 124 as the function of the sole 124 is to provide a guide for identifying a bite line in a repeated production process. This is in contrast to a functional purpose of the shoe sole assembly, which is generally provided for impact attenuation, support, and traction, among other reasons. The sole 124 may have any shape or size in an exemplary aspect.

Because the lasted upper 122 and/or corresponding sole 124 may often be formed from pliable and/or compressible materials, the location of an identified bite line on the surface of the lasted upper 122 may vary based upon the amount of force or pressure used to mate the lasted upper 122 with the corresponding sole 124. The predetermined amount of force applied by the system 100 during the identification of a bite line may be the same force applied when ultimately bonding the lasted upper 122 to the shoe sole assembly represented by the sole 124, but may be different than the force applied during bonding without departing from the scope hereof.

Figure 9:
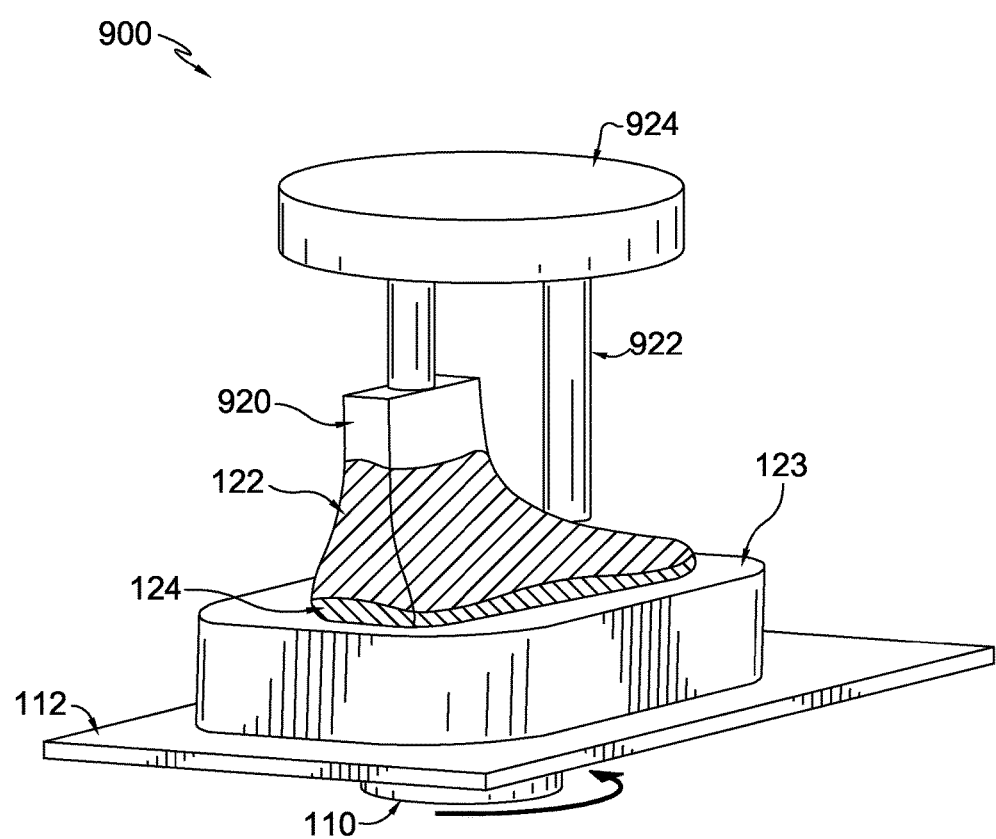
FIG. 9 depicts and exemplary last having a toe-portion press, in accordance with aspects hereof.

While an exemplary last 120 is depicted in FIG. 1 for illustrative purposes, it is contemplated that alternative lasts may be used in exemplary aspects. For example, turning to FIG. 9, an exemplary last 920 having a toe-portion press member 922 and a dispersion member 914 are depicted, in accordance with aspects hereof. The dispersion member 924 coupled the last 920 and the toe-portion press member 922 such that when a rotational force and/or a compressive force is applied to the dispersion member 924, the force is translated to each of the last 920 and the toe-portion press member 922. In an exemplary aspect it is contemplated that the toe-portion press member 922 is functional to provide a desired compressive force into the toe-portion of the last 920. This toe-portion press member 922 may allow, in an exemplary aspect, a more uniform application of pressure by the last 920 into the sole 124 and or maintainer 123. This application of more equal pressure may result in more consistent bite line detection as a more uniform application of pressure occurs over the entirety of the sole and the toe portion in particular. It is contemplated that the toe-portion press member 922 is optional and may be omitted entirely in exemplary aspects.

Returning to FIG. 1, the last 120 may be removeably secured by a clamping system 134. The clamping system 134 is comprised of a first clamp portion 128 and a second clamp portion 130. The clamping system 134 applies a compressive force on a portion of the last 120 to secure and maintain the last in a desired location. For example, the clamping system 134 may be effective for resisting an upwardly applied compressive force by the sole 124 when in a matted configuration. As such, the lasted upper 122 is minimally changed in the vertical direction as a result of the mating operation applied by the vertical assembly, in an exemplary aspect. Further, the clamping system 134 may be effective for resisting a lateral force applied by one or more components provided herein. It is also contemplated that that clamping system 134 is configured to allow for and even supply a rotational motion to the last 120. A rotation may be provided by a rotation drive 132 that is operatively coupled with the clamping system 134. The rotation drive 132 may be a motor or other rotational drive mechanism, in an exemplary aspect. The rotation may be provided at a desired speed to facilitate effective three-dimensional surface information capture around the lasted upper 122 and/or the sole 124. Why a specific arrangement and configuration of a clamping system 134 is provided, it is contemplated that any means may be implemented to achieve aspects provided herein.

The rotation drive 132 and the clamping system 134 are supported in the system 100 by a top support 136. The top support is fixedly coupled with the base support 102, which is effective for resisting translated compressive forces applied by the vertical system on the sole 124 to the lasted upper 122. Similarly, the top support 136 is effective for resisting a rotational change allowing a rotational motion to translate from the rotational drive 132 through the clamping system 134 to the last 120.

The system 100 is further comprised of a scanning assembly/system. The scanning system collects three-dimensional surface data of the lasted upper 122 and the sole 124. While any configuration of components capable of capturing a three-dimensional surface data set (e.g., stereopsis configured components) is contemplated, the following is described with respect to an imaging device 144 and an offset structured light source 142 that together with a computing device are effective for capturing three-dimensional surface information of the lasted upper 122 and the sole 124.

The distance between the structured light source 142 and the imaging device 144 is maintained by a carrier member 140. The illustrated scanning system relies on a structured light pattern projected by the structured light source 142 onto one or more surfaces to be scanned, such as the lasted upper 122 and/or the sole 124. The structured light source 142 may be any suitable light source that provides a defined geometrical representation at a distance from the surface to be scanned. For example, a slit lamp that produces a focused slit-like beam of light from an otherwise unstructured light source may produce the projected light needed to form a structured light reflection on the lasted upper 122. Another light source option includes a structured laser light source. A structured laser light source is a laser that projects a laser light in a structured light pattern, such as a line. This structured line of light may be formed by allowing light in a specific plane to fan outwardly from the source while constraining the dispersion of light in all other directions to result in a plane of light emanating from the structured laser source. When the plane of light contacts a surface, a laser line representation is formed having a focused nature and a controlled width perpendicular to the plane the light forms.

Three-dimensional data is determined based on a deformation of the structured light (e.g., a line) as it is reflected by different features on the scanned surface(s). The deformation from a known structured state is captured by the imaging device in a series of captured images. The computing device having computer readable media with instructions stored thereon for performing a method of identifying three-dimensional data from the series of images containing deformation of the structured light is used to determine a point cloud or other three-dimensional representation of the scanned surfaces. As is known in the art, the captured images having the deformed structure light may be computed to form a point cloud or other three-dimensional surface representation of the scanned surface(s).

In order to capture dimensional data of the sole 124 and/or the lasted upper 122, the combination of articles are rotated in the field of view of the imaging device 144. Additionally and/or alternatively, the scanning system may move in a lateral direction along a slide rail 138. For example, it is contemplated that the carrier member 140 may laterally move along at least a portion of the length of the slide rail 138. As a result, the structured light may project across different portions of the sole 124 and/or the lasted upper 122 by either lateral movement of the vision system and/or rotational movement of the sole 124 and/or the lasted upper 122, in an exemplary aspect. Further yet, it is contemplated that the sensing assembly may be moved in any direction and in combination with or independent of the lasted upper 122 movement to achieve a desired three-dimensional data capture. For example, it is contemplated that a relatively constant distance may be maintained between the lasted upper 122 and the sensing assembly to maintain a desired depth of field for the sensing assembly. This maintained depth may be achieved by configuring the system to linearly move the sensing assembly along a radial line extending from a rotational axis about which the lasted upper 122 rotates. Alternatively, it is contemplated that the sensing assembly is configured to move in an elliptical pattern about the lasted upper, in an exemplary aspect.

While not depicted, it is contemplated that a computing device, such as will be discussed in more detail at FIG. 8, may be operatively connected to one or more components of the system 100 to control or otherwise process information and/or data to achieve aspects provided herein, in an exemplary aspect.

Figure 2:
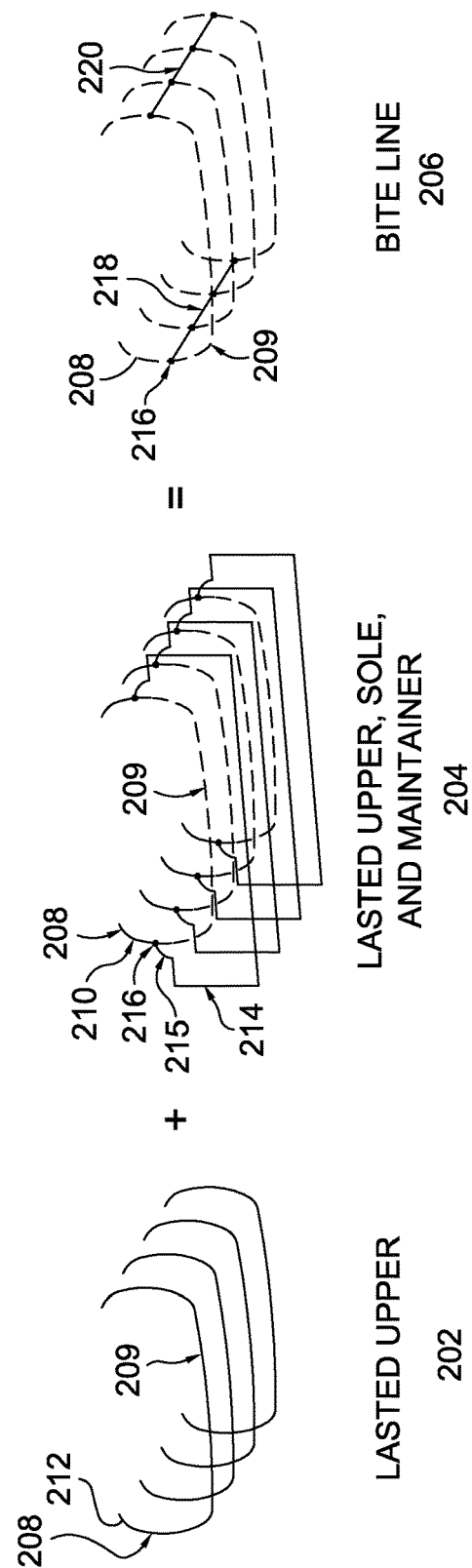
FIG. 2 depicts a simplified illustration of a divergence detection process for determining a bite line from a first three-dimensional data set of a lasted upper in an unmated configuration and a second three-dimensional data set of the lasted upper when mated with a sole, in accordance with aspects hereof.

FIG. 2 depicts a simplified illustration of the divergence detection process that is contemplated for determining a bite line from a first three-dimensional data set of a lasted upper in an unmated configuration and a second three-dimensional data set of the lasted upper when mated with a sole, in accordance with aspects hereof. A graphical illustration of a first three-dimensional data set 202 representing portions 212 of a lasted upper surface is provided, which may be extracted from a greater point cloud of points representing a surface identified in the three-dimensional data. Each of the portions 212 may include subsets of data representing a surface of the upper, such as a first subset 208 and a second subset 209. In an exemplary aspect, the first subset 208 is data representing a portion of the lasted upper surface that is above the bite line. Stated differently, the first subset 208 is a portion of the lasted upper surface that is not obscured by a sole when mated. While the portions 212 are depicted as linear segments, it is understood that the provided illustration is for illustrative purposes only and in practice may not be illustrated at all, but instead a point cloud maintained as dimensional coordinates internally to a processor and memory of a computing system.

A second three-dimensional data set 204 representing portions 210 of a lasted upper surface is provided. Each of the portions 210 may include subsets of data representing a surface, such as the first subset 208 and a third subset 214. The third subset 214 is data representing a portion of the maintainer as scanned. A fourth subset 215 is data representing a portion of the sole as scanned. The second subset 209 is depicted in dashed lines for contextual purposes only in the second three-dimensional data set 204 as the surface represented by the second subset 209 may be obscured during a scanning process. It is contemplated that data in the second three-dimensional data set 204 may not define the second subset 209 as the surfaces represented by the second subset 209 may be obscured from the scanning system, in an exemplary aspect. At a point of intersection between the first subset 208 and the fourth subset 215, a point 216 is formed.

The point 216 represents a point useable for defining a bite line on the lasted upper. However, to determine where the point 216 is on the lasted upper, a comparison between the first three-dimensional data set 202 and the second three-dimensional data set 204 is performed to identify which portions of the second three-dimensional data set 204 represent the mated sole and which portions represent the lasted upper. For example, the first three-dimensional data set 202 and the second three-dimensional data set 204, when aligned and registered together, may be analyzed to determine a convergence of the second subset 209 and the fourth subset 215 to the first subset 208. At a point of convergence (or alternatively a divergence), a bite line point may be determined, such as at the point 216. While convergence is discussed, it is also contemplated that a divergences or other comparison technique is implemented to deduce the portion of the three-dimensional data that represents the sole and which portion represents the lasted upper portion.

An example of the determination of a bite line may include comparing the data points forming the first three-dimensional data set 202 and the second three-dimensional data set 204 such that when data points of the first three-dimensional data set 202 and the second three-dimensional data set 204 diverge from one another, such as at a point 216, a change in the surface is determined at this point, which represents a transition from the lasted upper surface to the sole surface. This transition, in an exemplary aspect, defines the bite line location. A tolerance may be implemented to allow for variability in the three-dimensional data sets such that only when overlaid data points diverge from one another a specified amount (e.g., 0.01 mm -0.5 mm), is a determination made that a surface divergence is represented.

Based on the analysis of the first three-dimensional data set 202 and the second three-dimensional data set 204, a digital bite line data set 206 may be determined, as depicted by lines 218, 220. The first subset 208 and the second subset 209 are depicted in dashed lines to merely provide contextual information for purposes of illustrating the digital bite lines 218, 220, in this exemplary aspect. The bite lines 218, 220 may be interpolated from a connection among the series of points 216 from the represented portions 212 and 210. Stated differently, the bite lines may be determined based on determining a point of difference between the first three-dimensional data set 202 and the second three-dimensional data set 204 and then those determined points may be used with interpolation techniques to identify a location of the bite line relative to the lasted upper as captured by the data. As provided above, it is contemplated that a divergence from the first subset 208 to the second subset 209 and the fourth subset 215 at the point 216 identifies, by analysis, the location of the point 216 and a related bite line portion.

Figure 3:
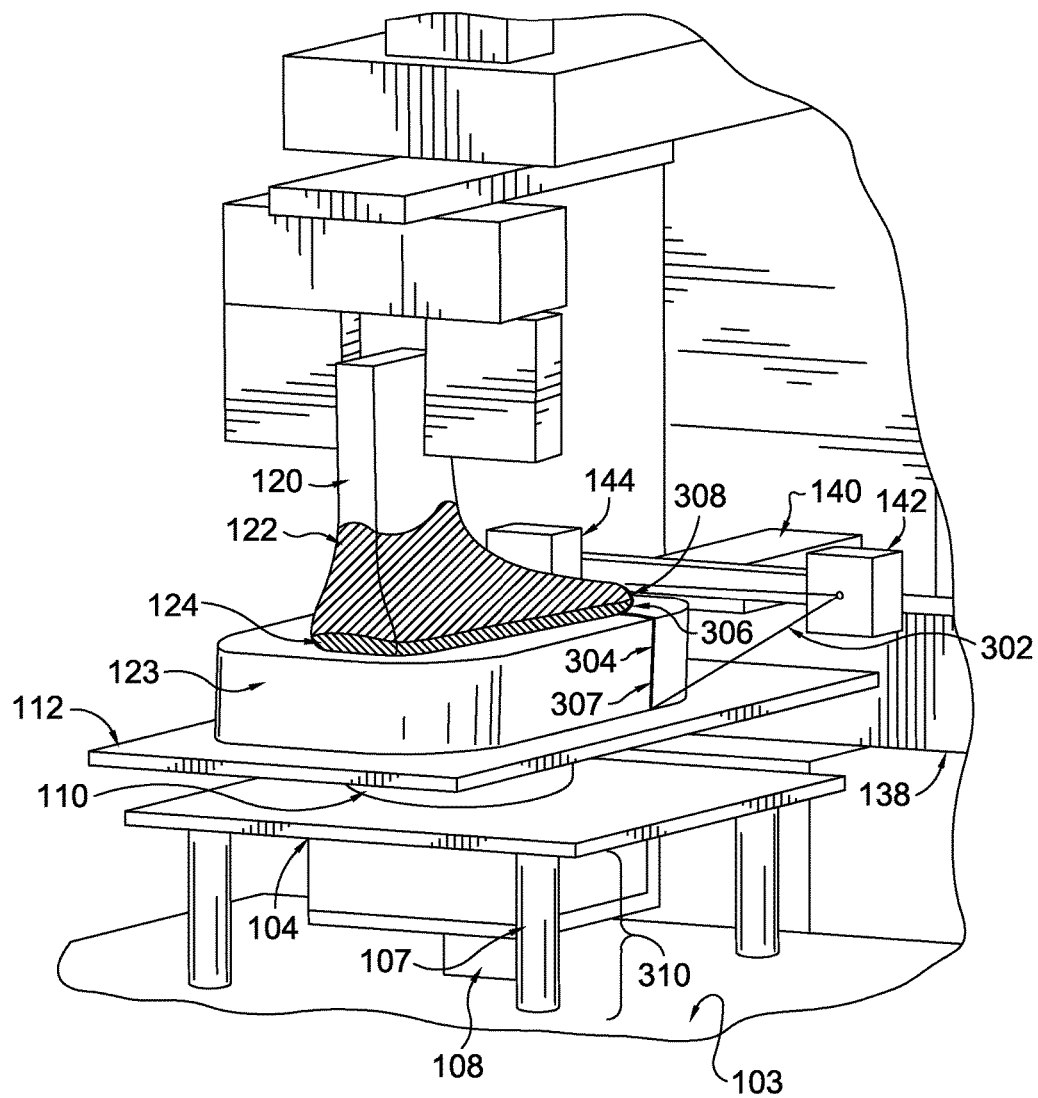
FIG. 3 depicts a focused view of the system from FIG. 1 with the lasted upper in a mated configuration with the sole, in accordance with aspects hereof.

FIG. 3 depicts a focused view of the system 100 from FIG. 1 with the lasted upper 122 in a mated configuration with the sole 124 as supported by the maintainer 123, in accordance with aspects hereof. As previously discussed, the lasted upper 122 may be placed in a mated or joined configuration with the sole 124 through a vertical movement of a vertical system actuated by the vertical actuator 108. As a result of this vertical positioning, the support plate 104 extends a height 310 above the top surface 103. As will be discussed in FIG. 4 hereafter, the height between the support plate or alternative components (e.g., the sole 124) is reduced when the lasted upper 122 and the sole are in an unmated configuration, in an exemplary aspect.

The light source 142 is depicted projecting a beam of light 302 that intersects with the lasted upper 122 and the sole 124 forming a structured light reflection 304. The structured light reflection may contain multiple subsets, such as a first subset 308 representing the structured light reflected from the lasted upper 122, a second subset 306 that represents the light reflected from the sole 124, and a third subset 307 that represents the light reflected from the maintainer 123, in an exemplary aspect. For discussion purposes and illustrative purposes, it is suggested that the first subset 308, the second subset 306, and the third subset 307 may result in the data identified as the first subset 208, the third subset 214, and the fourth subset 215 of FIG. 2, respectively.

It is contemplated that the imaging device 144 is configured to capture the structured light reflection 304 for use in determining a three-dimensional data set representing the surfaces from which the structured light reflects. Additionally, as previously discussed, it is contemplated that the lasted upper 122 and the mated sole 124 are rotated within the field of view of the imaging device 144 to capture images of the structured light reflection 304 across different portions of the lasted upper 122 and the sole 124 to form a volumetric representation representing the combination of elements as scanned. Further, it is contemplated that the scanning system may laterally move to capture one or more portions of the lasted upper 122 and the sole 124 surfaces.

Figure 4:
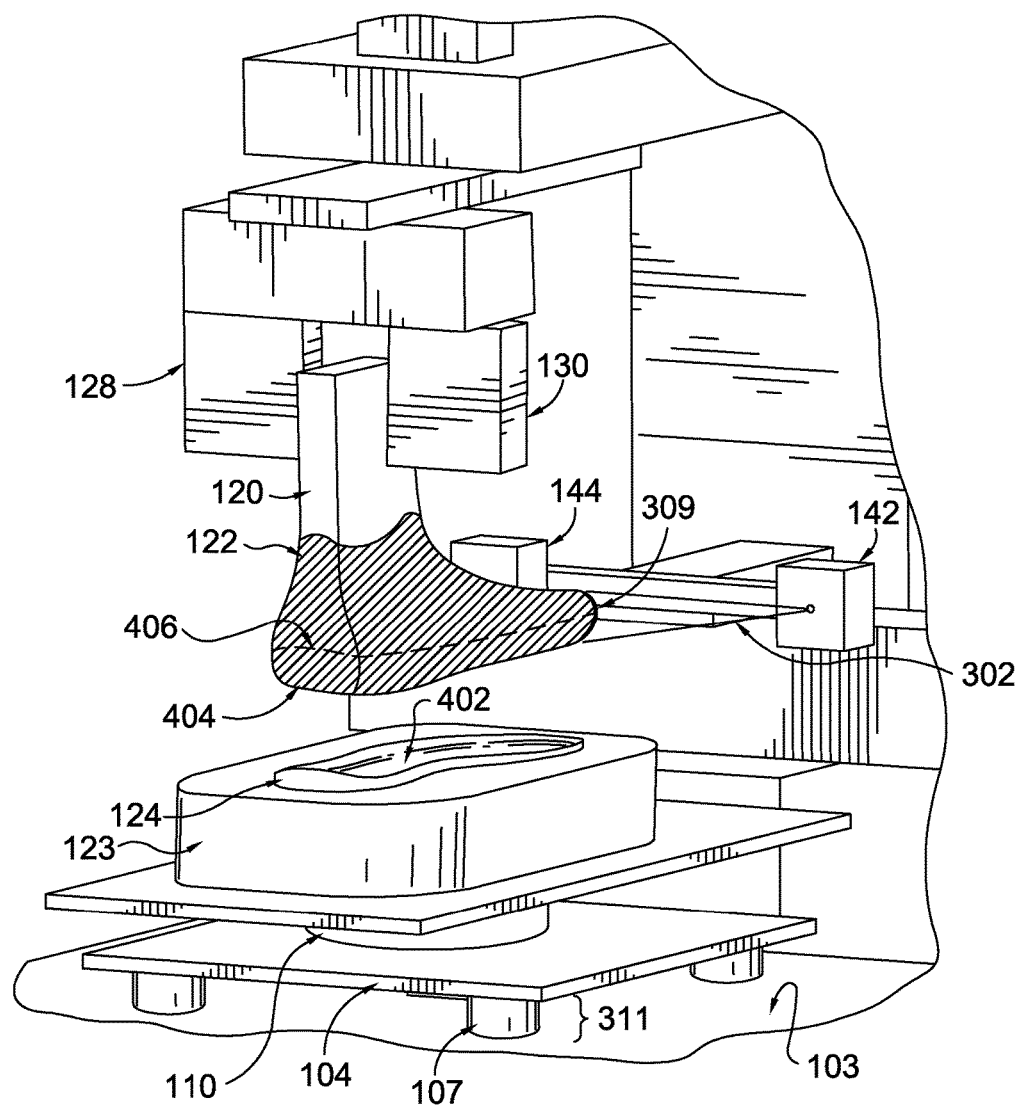
FIG. 4 depicts a focused view of the system from FIG. 1 with the lasted upper in an unmated configuration with the sole, in accordance with aspects hereof.

FIG. 4 depicts a focused view of the system 100 from FIG. 1 with the lasted upper 122 in an exemplary unmated configuration with the sole 124, in accordance with aspects hereof. As depicted, the sole 124 as maintained by the maintainer 123 is lowered relative to the lasted upper 122 such that a height 311 between the top surface 103 and the support plate 104 is reduced from the height 310 of previously discussed FIG. 3. It is contemplated that a bite line may be determined with a second data set having a height 311 that is less than the height 310. In the particular example of FIG. 4, the sole 124 is lowered to expose a complete bottom portion 404 of the lasted upper 122. However, as suggested above, the system may also determine a bite line even when a portion of the bottom portion 404 is not exposed from the sole 124. The bottom portion 404 may be defined as any portion that is obscured by the sole 124 when in a mated configuration. As such, a bite line 406 is illustrated in FIG. 4 for illustrative purposes as the bottom portion 404 is the portion that extends below the mated configuration intersection of the lasted upper 122 and the sole 124, which also coincides by design with the bite line location.

The scanning system is depicted as the structured light source 142 projecting the beam of light 302, which generates a light reflection line 309 reflecting from the lasted upper 122. As previously discussed, the imaging device 144 is configured to capture the light reflection line 309 as the light reflection line 309 reflects from the lasted upper 122 surface(s). The lasted upper 122 may be rotated within the field of view of the imaging device 144 to facilitate capturing the light reflection line 309 at different location on the lasted upper 122. In this example when the height 311 is a value allowing the lasted upper to completely clear from a cavity 402 configured to receive the lasted upper, the rotation of the lasted upper 122 does not also cause the rotation of the sole or other components of the vertical system. As also previously provided, the scanning system may laterally move to facilitate the scanning of various portions on the lasted upper 122, in an exemplary aspect.

Figure 5:
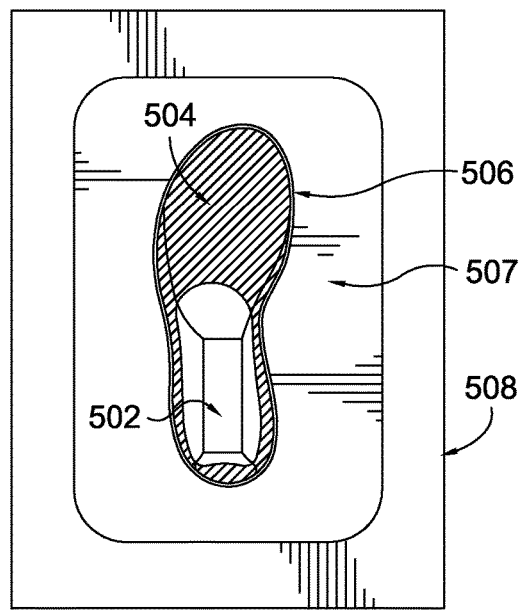
FIG. 5 depicts a top plan view of a rotational plate and maintainer supporting a sole mated with an upper lasted on a last, in accordance with aspects hereof.

FIG. 5 depicts a top plan view of a rotational plate 508 supporting a maintainer 507 that is maintaining a sole 506 mated with an upper 504 lasted on a last 502, in accordance with aspects hereof. While a specific shape and size of the maintainer 507 is depicted herein, it is contemplated that any size and shape of the maintainer 507 may be implemented such that an intersection between the lasted upper 504 and the sole 506 when in a mated configuration occurs at a location of a desired bite line. Therefore, it is contemplated that any size or shape of the maintainer 507 may be used or omitted entirely in aspects hereof.

Figure 6:
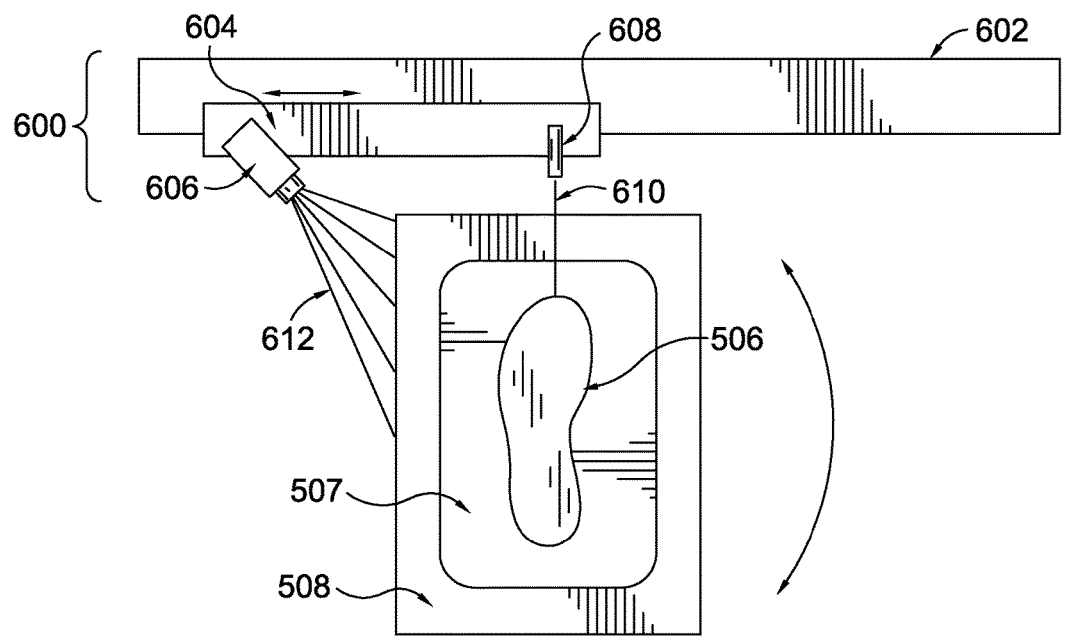
FIG. 6 depicts a top plan view of the rotational plate, maintainer, and the sole in relation to an exemplary scanning system, in accordance with aspects hereof.

FIG. 6 depicts a top plan view of the rotational plate 508, maintainer 507, and the sole 506 in relation to an exemplary scanning system 600, in accordance with aspects hereof. As previously discussed, a scanning system may be comprised of an imaging device 606 and a structured light source 608 maintained in a relative position by a coupling member 604. The coupling member may allow for lateral movement on a slide rail 602 such that various perspectives of the sole 506 and/or a lasted unit may be captured by the scanning system 600. A lateral arrow is depicted on the slide rail 602 representing a potential direction of travel. Further, it is contemplated that the rotational plate may rotate to provide or allow a multi-surface scan. The general direction of rotation is depicted by a curved arrow in FIG. 6.

The imaging device, such as a charge-coupled device (CCD) or other camera, is effective for capturing a reflected structured light from one or more surfaces, such as from a sole and/or a lasted upper. The imaging device has a field of view, such as a field of view 612 that defines a field that is able to be captured by the imaging device. The structured light source is also configured to output a structured light beam, such as a light beam 610 that is effective to form a vertical line as a reflection on one or more surfaces, such as a sole and/or a lasted upper.

Figure 7:
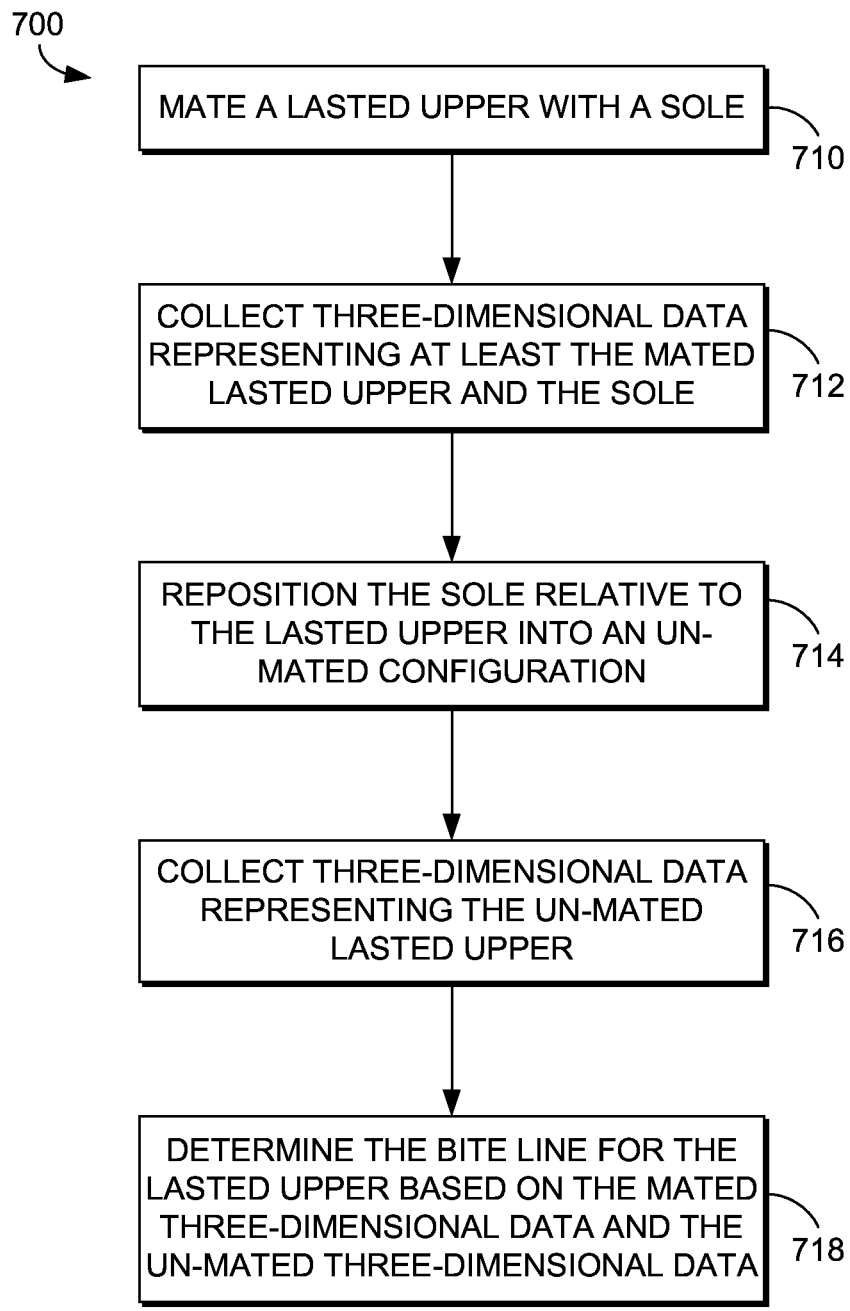
FIG. 7 depicts a flow diagram representing a method for determining a bite line on a lasted shoe upper, in accordance with aspects hereof.

FIG. 7 depicts a flow diagram representing a method 700 for determining a bite line on a lasted shoe upper, in accordance with aspects hereof. It is contemplated that while a specific order of steps is presented and discussed that alternative ordering may be implemented without departing from the scope of the aspects provided herein. At a first block 710 a step represents mating a lasted upper with a sole. As provided above, the mating of the lasted upper and the sole may include moving at least one of the lasted upper or the sole into a desired relationship such that an intersection created edge between the sole and the lasted upper defines a desired bite line. In an exemplary aspect, the sole is formed with a receiving cavity configured to receive a portion of the lasted upper. In an exemplary aspect, the portion of the lasted upper that the sole is configured to receive is a portion of the lasted upper that is to be covered by a sole assembly upon formation of the resulting shoe. Stated differently, the sole is configured with a receiving portion configured to receive a portion of the lasted upper that is intended to be covered by a shoe sole assembly at the completion of the shoe construction.

At a block 712, a step is depicted as including the collecting three-dimensional data representing the mated lasted upper and at least the sole. As also depicted in FIG. 3 hereinabove, three-dimensional data representing the mated lasted upper and at least the sole may include data representing the lasted upper, the sole, and the maintainer, in an exemplary aspect. It is contemplated that the collection of the three-dimensional data may be accomplished by a variety of means, such as a multi-camera stereopsis arrangement. Additionally, and as discussed herein, it is contemplated that the three-dimensional data may be captured through the use of a structured light reflected from the surface to be scanned with an imaging device (e.g., a sensing device) capturing the structured light reflection. Additional sensing devices contemplated include, but are not limited to CCD, cameras, sonography, photometric, time-of-flight, and other known three-dimensional scanning techniques. The data may be collected by rotating the mated lasted upper and the sole in a field of view of a fixed scanning system. Alternatively, it is contemplated that the scanning system may rotate or move around a stationary mated lasted upper and sole. Further, it is contemplated that the mated lasted upper and sole may be rotated a desired degree to expose a particular portion of a surface and then the scanning system may move, such as in a linear path, to capture a portion of the exposed surface. Other combinations or techniques are contemplated for capturing a multi-sided scan of the mated lasted upper and sole such that the bite line can be determined around the periphery of the combination of elements.

At a block 714, a step is depicted for repositioning the sole relative to the lasted upper into an un-mated configuration. The repositioning may include moving the sole away from the lasted upper, moving the lasted upper away from the sole, or moving both the lasted upper and the sole away from a mated configuration. An unmated configuration is an arrangement of the lasted upper and the sole such that a lesser portion (if any) of the lasted upper is obscured from the scanning device field of view. For example, when the lasted upper is maintained in a consistent vertical position while the sole is lowered away from the lasted upper, a greater portion of the lasted upper is exposed to the scanning system such that three-dimensional data in the unmated configuration provides a different surface definition than the three-dimensional data in the mated configuration. It is this difference in the surface definitions provided by the data that is useable to deduce the location of a bite line, which is represented by the intersection of the lasted upper and a top edge of the sole, in an exemplary aspect.

At a block 716, a step of collecting three-dimensional data representing the unmated lasted upper is provided. As discussed with respect to block 712, various scanning systems are contemplated. For example, a structured light source in combination with a sensing device, such as a CCD, may be maintained in a static position relative to the scanned articles and/or the scanning system may be moved, such as linearly, circularly, or elliptically, in an exemplary aspect.

At a block 718, a step of determining the bite line for the lasted upper based on the mated three-dimensional data and the unmated three-dimensional data is provided. A provided herein, it is contemplated that a number of techniques may be used to determine a bite line location based on the two data sets. For example, the mated three-dimensional data may be registered with the unmated three-dimensional data, such as a aligning a portion of the lasted upper that is common to both data sets. After registering the data, a divergence in the two data sets may identify a discrepancy caused by a repositioning of the sole relative to the lasted upper. A computing system may analyze the data sets with additional information that an edge formed in the mated three-dimensional data set at the intersection of the lasted upper and the sole that is different in the unmated three-dimensional data set represents a bite line location. Stated differently, a computing device may determine where an edge formed by the intersection of the lasted upper and the sole when mated represents the bite line. As previously provided, it is contemplated that alternative ordering may occur of one or more steps provided in method 700. For example, steps represented by blocks 716 and 718 may occur prior to steps represented by blocks 710 and 712, in an exemplary aspect.

Figure 8:
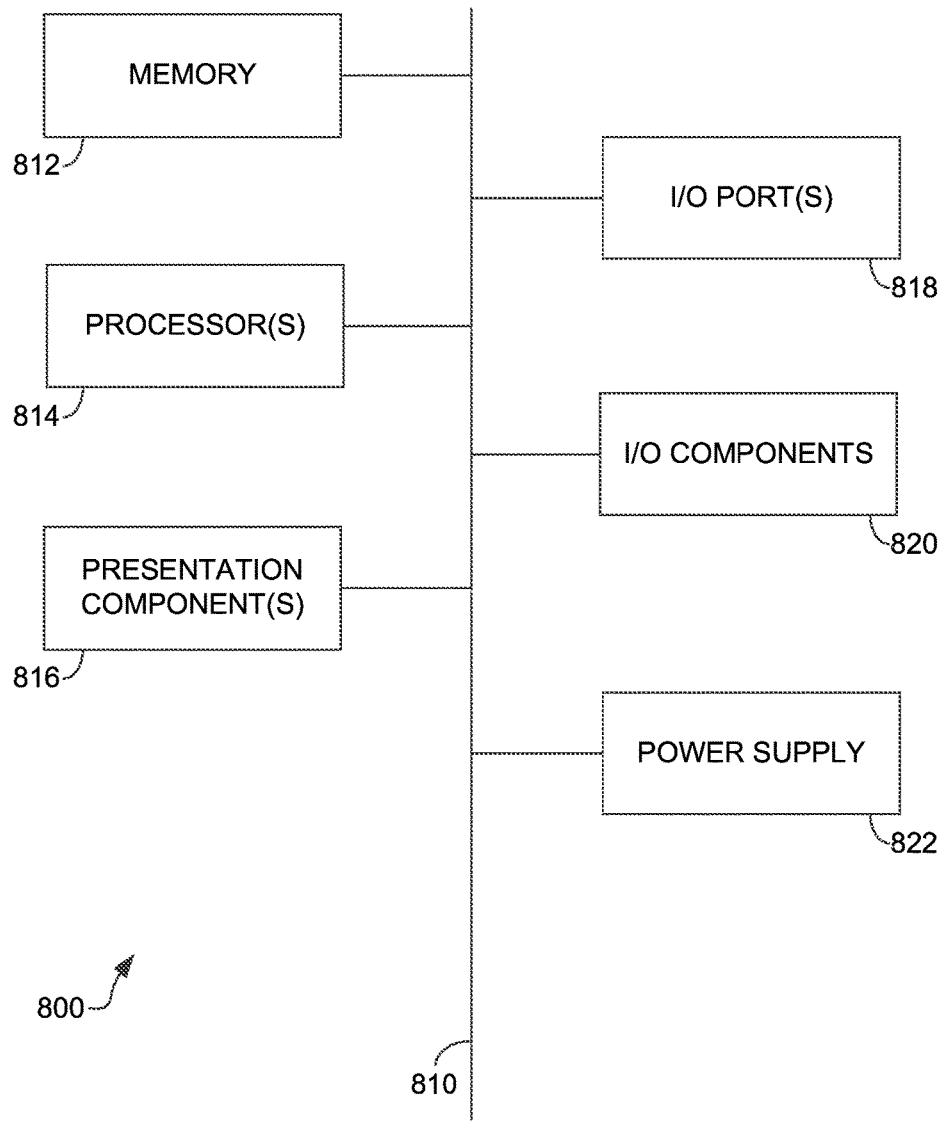
FIG. 8 depicts an exemplary computing operating environment, such as a programmable logic controller and/or a personal computer, for implementing aspects of the invention hereof.

FIG. 8 depicts an exemplary computing operating environment for implementing aspects of the invention is shown and designated generally as computing device 800. For example, aspects provided herein contemplated using a computing device to store and analyze the three-dimensional surface data to determine a bite line location. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program components, being executed by a computer or other machine, such as a programmable logic controller ("PLC"). Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, personal computers, specialty computing devices, PLC, etc. Embodiments of the invention may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, and an illustrative power supply 822. Bus 110 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component 820. Also, processors have memory. The inventors hereof recognize that such is the nature of the art, and reiterate that the diagram of FIG. 8 is merely illustrative of an exemplary computing device that can be used in connection with one or more embodiments of the invention. Distinction is not made between such categories as "workstation," "server," "laptop," "handheld device," "tablet," "phone," "node," "PLC," etc., as all are contemplated within the scope of FIG. 8 and refer to "computer" or "computing device." In particular, aspects of the present invention are contemplated as being performed in whole or in part on one or more components of a distributed computing system. It is contemplated that a distributed computing system may be comprised of processors, networks, and memory that scale to handle as desired level of computing processes at a time. Therefore, it is contemplated that a computing device may also refer to the computing environment of a distributed computing system that dynamically changes with time and/or demand.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data.

Computer-storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory 812 may be removable, nonremovable, or a combination thereof. Exemplary memory includes non-transitory, solid-state memory, hard drives, optical-disc drives, etc. Computing device 800 includes one or more processors 814 that read data from various entities such as bus 810, memory 812 or I/O components 820. Presentation component(s) 816 present data indications to a person or other device. Exemplary presentation components 816 include a display device, speaker, printing component, vibrating component, etc. I/O ports 818 allow computing device 800 to be logically coupled to other devices including I/O components 820, some of which may be built in. Illustrative I/O components 820 include a microphone, joystick, game pad, satellite dish, scanner, printer, wireless device, etc.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A method for determining a bite line on a lasted shoe upper, the method comprising:
   mating a lasted upper with a sole configured for the lasted upper;
   collecting three-dimensional data, by a sensing assembly and processed by a computing device, representing the mated lasted upper and the sole as mated three-dimensional data, wherein the mated three-dimensional data includes at least; 1) an edge defined by a transition from the lasted upper to the sole, the edge identifying the bite line on the lasted upper; and 2) a first portion of the lasted upper, wherein the sensing assembly comprises a structured light source and a sensing device;

repositioning the sole relative to the lasted upper into an un-mated configuration;

collecting three-dimensional data, by the sensing assembly and processed by the computing device, representing the lasted upper in the un-mated configuration as un-mated three-dimensional data, wherein the un-mated three-dimensional data includes a second portion of the lasted upper, the second portion of the lasted upper being greater than the first portion of the lasted upper; and determining, via the computing device comprising one or more processors, the bite line for the lasted upper based on the mated three-dimensional data and the un-mated three-dimensional data, wherein the determining, via the computing device, the bite line based on the un-mated three-dimensional data and the mated three-dimensional data comprises comparing the un-mated three-dimensional data and the mated three-dimensional data.

2. The method of claim 1, further comprising temporarily coupling the lasted upper to a scanning mechanism and positioning the sole at the scanning mechanism to effectively be mated with the lasted upper.

3. The method of claim 1, wherein mating of the lasted upper and the sole is comprised of moving the sole to the lasted upper with pressure applied between the lasted upper and the sole to maintain a desired physical interaction between the lasted upper and the sole.

4. The method of claim 1, wherein collecting the mated three-dimensional data is further comprised of:

projecting a structured light at the mated lasted upper and the sole; and capturing with the sensing device a reflected portion of the structured light from the mated lasted upper and sole.

5. The method of claim 4, wherein collecting the mated three-dimensional data further comprises moving the structured light and the sensing device relative to the mated lasted upper and sole.

6. The method of claim 5, wherein collecting the mated three-dimensional data further comprises rotating the mated lasted upper and sole to expose a different surface portion to the structured light and the sensing device.

7. The method of claim 4, wherein collecting the mated three-dimensional data further comprises rotating the structured light and the sensing device around the mated lasted upper and sole.

8. The method of claim 1, wherein the repositioning is comprised of moving the sole away from the lasted upper without repositioning the lasted upper.

9. The method of claim 1, wherein the repositioning is comprised of moving the lasted upper away from the sole without repositioning the sole.

10. The method of claim 1, wherein the collection of the un-mated three-dimensional data is comprised of moving the structured light source and the sensing device in an elliptical relationship along the lasted upper.

11. The method of claim 1, wherein determining the bite line further comprises:

identifying points where the mated three-dimensional data diverges from the un-mated three-dimensional data to identify the bite line location of the lasted upper.

12. The method of claim 11, wherein the mated three-dimensional data diverges from the un-mated three-dimensional data at the edge between the lasted upper and the sole when mated.

13. The method of claim 11, wherein the identifying points where the mated three-dimensional data diverges from the un-mated three-dimensional data comprises identifying points where the mated three-dimensional data diverges from the un-mated three-dimensional data by a specified distance.

14. A bite line determination system comprising:

a rotation mechanism configured to rotate a lasted upper;

a mating mechanism configured to mate and un-mate a sole from the lasted upper, the mating mechanism is configured to move linearly in a direction parallel with an axis about which the rotation mechanism rotates;

a sensing assembly comprising a structured light source and a sensing device; and a computing device comprised of a processor and memory adapted to determine a bite line of the lasted upper based on a divergence between three-dimensional data collected by the sensing assembly and processed by the computing device, the three-dimensional data comprising: i) three-dimensional data for the lasted upper and the sole in a mated relationship; and ii) three-dimensional data for the lasted upper in an un-mated relationship, wherein the three-dimensional data for the lasted upper and the sole in the mated relationship includes a first portion of the lasted upper, and wherein the three-dimensional data for the lasted upper in the un-mated relationship includes a second portion of the lasted upper, the second portion of the lasted upper being greater than the first portion of the lasted upper.

15. The bite line determination system of claim 14, further comprising a controller, the controller adapted to control the rotation of the rotation mechanism or movement of the sensing assembly.

16. The bite line determination system of claim 15, wherein the controller instructs the rotational mechanism to rotate the lasted upper a defined degree of rotation after the controller instructs the sensing assembly to move a linear distance.

17. The bite line determination system of claim 14, wherein the rotation mechanism is comprised of a releasable last maintainer, the last maintainer configured to maintain the lasted upper in a defined relative location during the movement of the rotation mechanism and the mating mechanism.

18. The bite line determination system of claim 14, wherein the structured light source is a laser and the sensing device is a charge-coupled device.

19. The bite line determination system of claim 14, further comprising computer readable memory having instructions embodied thereon that when performed by the processor and memory cause the computing device to perform a method, the method comprising:

capturing a mated three-dimensional data representation of the lasted upper and the sole in the mated relationship;

capturing an un-mated three-dimensional data representation of the lasted upper in the un-mated relationship with the sole; and determining a bite line of the lasted upper based on a divergence of the mated three-dimensional data and the un-mated three-dimensional data, where the divergence occurs at an intersection of the lasted upper and the sole in the mated relationship.

20. The bite line determination system of claim 14, further comprising a multi-axial applicator adapted to utilize the determined bite line as a bounding line for application of an agent to the lasted upper.

* * * * *

UNITED STATES PATENT AND TRADEMARK OFFICE
CERTIFICATE OF CORRECTION

| | | |
|---|---|---|
| PATENT NO. | : 10,524,544 B2 | Page 1 of 1 |
| APPLICATION NO. | : 14/161283 | |
| DATED | : January 7, 2020 | |
| INVENTOR(S) | : Dragan Jurkovic et al. | |

It is certified that error appears in the above-identified patent and that said Letters Patent is hereby corrected as shown below:

Column 14, Line 63: In Claim 1, delete "least;" and insert --least:--.

Signed and Sealed this
First Day of December, 2020

Andrei Iancu
*Director of the United States Patent and Trademark Office*